United States Patent
Deng et al.

(10) Patent No.: US 11,102,139 B1
(45) Date of Patent: Aug. 24, 2021

(54) SHARED QUEUE MANAGEMENT UTILIZING SHUFFLE SHARDING

(71) Applicant: Amazon Technologies, Inc., Seattle, WA (US)

(72) Inventors: Cecilia Deng, Seattle, WA (US); Bharatkumar Chatla, Seattle, WA (US); Marc John Brooker, Seattle, WA (US); David J. Carroll, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 198 days.

(21) Appl. No.: 16/122,572

(22) Filed: Sep. 5, 2018

(51) Int. Cl.
*H04L 12/863* (2013.01)
*H04L 29/08* (2006.01)
*H04L 12/26* (2006.01)
*H04L 12/911* (2013.01)

(52) U.S. Cl.
CPC .......... *H04L 47/6295* (2013.01); *H04L 43/10* (2013.01); *H04L 47/70* (2013.01); *H04L 67/02* (2013.01)

(58) Field of Classification Search
CPC ..... H04L 47/6295; H04L 43/10; H04L 47/70; H04L 67/02

USPC ........................................................ 709/226
See application file for complete search history.

(56) References Cited

U.S. PATENT DOCUMENTS

| | | | |
|---|---|---|---|
| 2007/0156869 A1* | 7/2007 | Galchev | G06F 9/505 709/223 |
| 2012/0140633 A1* | 6/2012 | Stanwood | H04L 47/2425 370/235 |
| 2013/0074089 A1* | 3/2013 | Madaiah | G06F 9/4881 718/103 |
| 2015/0124614 A1* | 5/2015 | Alizadeh Attar | H04L 61/6095 370/235 |
| 2016/0283283 A1* | 9/2016 | Jung | G06F 9/5033 |
| 2017/0116055 A1* | 4/2017 | Harran | G06F 9/546 |
| 2018/0191663 A1* | 7/2018 | Harpaz | H04L 51/32 |

\* cited by examiner

*Primary Examiner* — Meng Vang
(74) *Attorney, Agent, or Firm* — Nicholson De Vos Webster & Elliott LLP

(57) ABSTRACT

Techniques for performing shared queue management utilizing shuffle sharding are described. For an event, one shared queue can be selected by first identifying a shard of a pool of queues, selecting two or more queues from the shard, and selecting the one queue that has a minimum queue load from those queues in the selected two or more queues. The selection significantly reduces or eliminates negative impacts upon a user or user function from activity of other users that utilize the shared queues.

20 Claims, 11 Drawing Sheets

```
GetQueue Request
{
  "id":           "random uint64",
  "function_arn": "string",
  "timeout":      "relative to request in seconds"
}
```

```
GetQueue Response
{
  "id":        "random uint64",
  "queue_url": "string"
}
```

SHARED QUEUE MANAGEMENT UTILIZING SHUFFLE SHARDING

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media for shared queue management utilizing shuffle sharding are described. According to some embodiments, a managed queuing service manages multiple shared queues between users while preventing traffic spikes from ones of the users from significantly affecting other users. In some embodiments, for an event (such as a request from a client) needing to be queued and ultimately causing the execution of application (also referred to as a "function" or "user function", which can be a portion of code, a compiled or interpreted application, a set of procedures or routines, etc., that can be run or executed using one or more processors), a "shard"— or a subset of a total number of queues available in the system—is selected. From this shard, a set of two or more queues are selected, and the queueing service selects the one queue from this set of two or more queues having a smallest queue load, which may be based on a queue depth—e.g., a number of events currently known (or recently known) to be in that queue—and/or attributes of the application(s) or requests themselves, such as the amount of time for the corresponding applications to process the request(s) in the queue. This queue having the smallest queue load is selected to be the recipient of the request. Accordingly, due to the nature of this selection process, events associated with one user/customer (or one user function, etc.) are extremely unlikely to be placed within a queue that is overloaded due to substantial traffic of another user. Moreover, in some embodiments, even in the extremely unlikely event that the set of two or more queues available for a request are all full or substantially full, the queuing service can adapt the selection process for those users (or user functions, etc.) not creating the congestion, thus eliminating the impact of the congestion for the innocent users.

Figure 1:
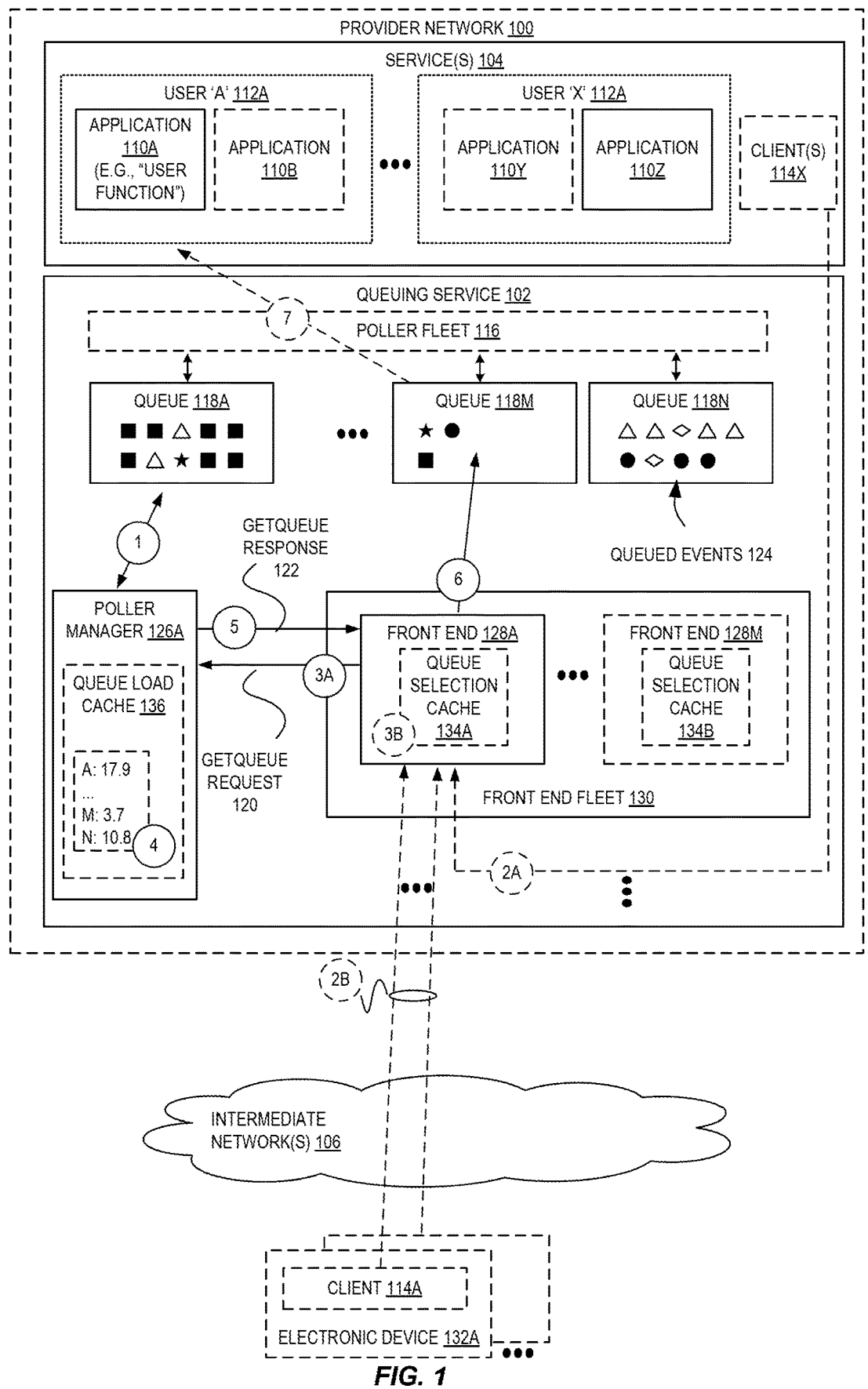
FIG. 1 is a diagram illustrating an environment for performing shared queue management utilizing shuffle sharding with centralized control according to some embodiments.

FIG. 1 is a diagram illustrating an environment for performing shared queue management utilizing shuffle sharding with centralized control according to some embodiments. As illustrated, a queuing service 102 may operate within a provider network 100. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services 104, such as a hardware virtualization service that can execute compute instances (that execute one or more applications 110A-110Z), a storage virtualization service that can store data objects, a serverless execution service that can execute code (e.g., an application 108/user function) on behalf of a user (e.g., user 'A' 112A), etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s) of the provider network 100, such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to users.

To provide these and other computing resource services, provider networks 100 may rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

Generally speaking, a queueing service 102 can act as a managed queuing service for requests (also referred to commonly as "events"). Such events may be generated or triggered by a variety of entities, such as other services 104 (e.g., a client 114X executed in or a part of a service 104) or by a particular client 114A—e.g., a request may be issued to trigger a user function (or application 110) to be invoked and run, which thus can be represented as an event. A queueing service may thus "connect" multiple events and offer a managed queuing service for invoking them. For example, if a client 114A uploads an image to a storage virtualization service, this event may trigger a request that is queued by the queueing service 102 seeking to cause the invocation of another application 110 (e.g., a serverless execution service) via a fleet of pollers 116, and this application may transform that image into another format or representation and/or store it somewhere else. However, a queueing service also works in other types of environments, and thus is not limited for use within a service provider network 100, for use with applications 110, events, etc., as is known to those of skill in the art.

In queueing systems, many issues occur when many different users are involved. Continuing the example presented above, if a first user uploads twenty million images in a small amount of time (e.g., an hour, a day), the resulting events may go to the queueing service 102 (e.g., for file conversion operations to be performed by a user function), but the capacity that any individual account (of an application 110 or service 104) has available to process the events is typically limited. Accordingly, the events will queue up over the course of several hours, days, or longer. Thus, it is not desirable to have a single queue per user (or per user function) due to this potential overwhelming of the queue, due to the extreme waste in maintaining these resources when they are unused, and due to the tremendous difficulty in managing huge numbers of such queues needed for large numbers of users.

In some systems, then, a fleet of queues 118A-118N are utilized as "shared" queues. As one example, a large fleet of queues 118 could be generally available for many different users. As shown in FIG. 1, events from different users are indicated using different shapes—e.g., queue 118A includes seven "square" events from a first user, two "triangle" events from a second user, and one "star" request from a third user. However, the use of shared, generally-available queues can still lead to user impacts in terms of queue backups/unavailability when one or more users send (or cause to be sent) an extremely large number of events. For example, a queue may include a huge number of events from a first user (e.g., nearly all "square" events) thus slowing down or preventing events from other users from being placed in the queue and/or processed (and removed) from the queue.

Another configuration for utilizing shared queues could include hashing (or otherwise assigning) users to a subset of the shared queues—one setup would be to have users 1-100 share a first set of queues, users 101-200 share a second set of queues, and so on. However, this configuration still wastes capacity, and more importantly leads to user impacts in terms of queue backups/unavailability (e.g., for users 2-100) when some users (e.g., user 1) are heavily using the shared set of queues. Further, if a fleet of pollers 116 service the queues 118, a heavy use of a first set of queues may "starve" the ability of other users—within the same first set of queues, and even within other sets of queues—from having their events processed in a timely manner as the fleet of pollers 116 may be occupied disproportionally servicing the "busy" user's events.

Another configuration for utilizing shared queues could involve hashing each user to a single queue of a fleet of shared queues, but this again leads to problems for those users sharing a single queue when one of those users sends a lot of events.

Yet another configuration to utilizing shared queues could involve mapping a user (or user function) to two queues in the fleet and looking at the queue depth of each (that is, a number of queued events 124 already in the selected queues), and picking the one that has the fewest number of messages (i.e., the smallest queue depth). This approach is beneficial in that it provides some user isolation, so one busy user won't impact a large number of the other users. However, in systems with many users, it is likely that two users (or user functions) could be mapped to the same two queues, and thus one busy user (or "noisy neighbor") could affect one or potentially more users. Additionally, a first user could be affected by a second other busy user that overlaps with a first queue of the first user, and similarly affected by a third other busy user that overlaps with the second queue of the first user, leaving the first user with no unaffected queues. Accordingly, while this approach does provide relatively good user isolation, embodiments disclosed herein can further improve on the approach to even further reduce, or possible eliminate, users from being affected from the activity of other users while continuing to utilize shared queues.

The environment shown in FIG. 1 illustrates a queueing service 102 including a plurality of queues 118A-118N that store queued events 124 (which can be requests or other data structures, as described herein, that cause an execution of an application/function). The plurality of queues 118A-118N can be implemented using hardware, as software, or a combination of both. For example, a queue may comprise a region of memory (e.g., Random Access Memory (RAM)) or storage (e.g., a Solid-State Disk (SSD)). A queue could alternatively be a virtual storage entity, such as a bucket or folder, which may be provided by a storage virtualization service. A queue could also comprise a set of tables or records of a database. Other implementations of queues known to those of skill in the art could also be used.

Optionally, in some embodiments the plurality of queues 118A-118N are serviced by one or more pollers (or, a "fleet" of pollers) that obtain queued events 124 from the queues and cause them to be distributed and/or processed in a particular manner (e.g., by particular applications 110, such as code provided by a user 112 that is executed in a "serverless" manner) or cause the invocation of code (e.g., an application 110). Thus, upon obtaining an event 124 from a queue (e.g., queue 118A), a poller may forward the request to a desired application, execute the desired application, etc. Upon beginning processing the request or upon the completion of the processing (e.g., by the application or the poller itself), the poller may cause that request to be removed from the queue. Thus, multiple pollers may operate to "service" the queued events 124.

The queueing service 102 also includes a poller manager 126A, which may be implemented as hardware, software, or a combination of both. For example, in some embodiments a poller manager 126A is an application executed by one or more server computing devices (e.g., as an application within a virtual machine, etc.). As shown at circle (1), the poller manager 126A is a logically centralized entity that monitors the status of the plurality of queues 118A-118N to determine a queue load of each queue. As indicated above, a queue load may be a value that is based on a number of events in a queue and/or characteristics of the events of the queue (and/or characteristics of the application(s) that are run based on the events). For example, in some embodiments a queue load may be based on a number of events in the queue, and in other embodiments, a queue load may be based on one or more of a number of events in the queue, expected execution characteristics (e.g., execution/processing time) for the events, etc. A queue load may be a numeric value (e.g., a number of events in the queue, a value based on weighting each request based on an expected time to execute/process each request, a percentage of queue utilization, an enumerated type value in a range indicating a level of utilization) or a non-numeric value (e.g., a value indicating "very full," "moderately full," or the like).

The deployment of the poller manager 126A as a centralized entity allows the queue routing decision logic to be maintained in one place, can allow for queue routing logic to be changed quickly and easily, and can allow for queues to be easily added to or added from the pool of queues simply. Moreover, the monitoring of the queue loads may be performed by just one actor, thereby reducing network and computational overhead associated with multiple such actors.

This monitoring of queue loads may be done directly by the poller manager 126A (e.g., by issuing requests to the queues and receiving responses from the queues indicating their queue loads) or indirectly (e.g., by obtaining queue load information from another entity, such as a monitoring service (not illustrated here) that may obtain, store, and report logging-type information sent by the queues to the poller manager 126A.

The poller manager 126A can update its queue load information in a variety of ways. In some embodiments, the poller manager 126A obtains updated information periodically—e.g., every 5 seconds, 30 seconds, minute, five minutes, etc. In other embodiments, the poller manager 126A obtains updated information in an on-demand synchronous fashion, such as when the poller manager 126A needs a queue load for a particular analysis.

At some point in time, a request/event is generated by a client 114 that is provided to a front end 128A, which may be one of a fleet of front ends 130. A front end 128A may be a software application—e.g., an application, a web server with an application, etc.—that can receive requests/events. In some embodiments, each front end 128A acts as a web service and thus includes a web server that can receive HyperText Transfer Protocol (HTTP) requests. The requests/events may be originated by another application (e.g., a client 114X) or service 104 within a provider network 100 as shown by circle (2A), a client 114A that is external to a provider network 100 as shown by circle (2B), which may be an application (e.g., a web browser, special purpose application, library, etc.) that executes on an electronic device 132A (e.g., a personal computer, a mobile device, a server computing device) that may or may not be operated by a user which sends request messages across one or more intermediate networks 106. In some embodiments the request/event is sent to a particular front end 128A (e.g., using a network address assigned to that front end 128A), though in many embodiments the requests/events are sent to the fleet of front ends 130, which the requests are provided to the particular front ends 128A-128M according to some distribution scheme (e.g., random, load-based, round robin, etc.) known to those of skill in the art.

The front end 128A, upon receipt of a request, determines which queue 118 to provide the request to. In some embodiments, the front ends 128A-128M may send a GetQueue (or "get queue") request 120 (e.g., an HTTP request message) at circle (3A) to request an identifier of which queue is to be selected, which ultimately is returned at circle (5) within a "GetQueue" response 122 message (e.g., an HTTP response message). In some embodiments, such a GetQueue request 120 is sent for every request that the front ends receive.

However, in other embodiments, the front ends maintain (each, or in in one collective location accessible to all front ends) a queue selection cache 134 that stores a particular queue identifier that was returned in a GetQueue response 122 (for events from a particular user, for events involving for a particular application 110A or applications 110A-110B, etc.) for some amount of time (e.g., thirty seconds). Thus, for a request having a corresponding entry in the queue selection cache 134A (e.g., based on being from a same user, from a same client, destined to a same application, etc.), the front ends may perform a lookup in the cache to see if an entry exists that is still valid (e.g., has been obtained "recently" enough according to a threshold, such as within the last thirty seconds), and if so, the front ends may use the cached identifier of the particular queue and provide the request to that queue. If no entry exists in the queue selection cache 134A, or if an entry exists but it is invalid (e.g., expired), the front ends may thus send another GetQueue request 120 to solicit the destination queue identifier provided in a GetQueue response 122.

With an identified queue, the front end 128A may provide the request to the corresponding queue—here, queue 118M, as shown at circle (6). Thereafter, the request is eventually provided (e.g., via a poller of the poller fleet 116, or directly by an application 110A accessing the queues) to the destination application 110A, or the particular application 110A is invoked (e.g., via a poller of the poller fleet 116) as shown at optional circle (7).

The poller manager 126A, upon receipt of a GetQueue request 120, determines which queue (here, queue 118M) of the plurality of queues 118A-118N the request should be provided to at circle (4). This determination can be based on queue loads of the plurality of queues 118A-118N, which may be obtained synchronously by the poller manager and/or obtained from a queue load cache 136, which includes queue load information previously obtained by the poller manager 126A. For example, the determination includes, in some embodiments, selecting the queue having a minimum queue load value—as shown in FIG. 1, queue "M" 118M may be selected as a destination as its value of 3.7 is less than all other queue load values.

The queue load information may include, for a queue, a queue load value indicating a number of events in the queue, a queue load value based on both a number of events and "weights" indicating a predicted (actual or relative) processing amount (e.g., estimated processing time) for the particular events, etc. For example, as shown, it may be the case that "square" events have a weight of "2", "triangle" events have a weight of "1.5", "star" events have a weight of "0.9", "circle" events have a weight of "0.8", "diamond" events have a weight of "1.2", etc., where each weight may be relative (e.g., a weight of 2 requires approximately twice as much processing time as a weight of 1) or actual (e.g., a weight of 2 indicates 2 units of time are required for processing—e.g., 2 ms, etc.) Thus, in one formulation, the queue load value for a queue is the sum of multiple request weights, where each request weight is the number of the type of request multiplied by the corresponding weight. For example, the queue load for queue 118A may be equal to 7*2+2*1.5+1*0.9=17.9 (as 7 square events multiplied by the weight of 2=14, 2 triangle events multiplied by the weight of 1.5=3, and so on). In some embodiments using a queue load cache 136, upon the poller manager 126A obtaining a queue load for a particular queue, the poller manager 126A may store an entry in the queue load cache 136 storing the queue load. Each entry may be stored indefinitely (until it is updated again), or may be valid for a limited amount of time and "expire" at the end of that time period (e.g., 30 seconds, 20 seconds, 60 seconds, etc.).

Figure 3:
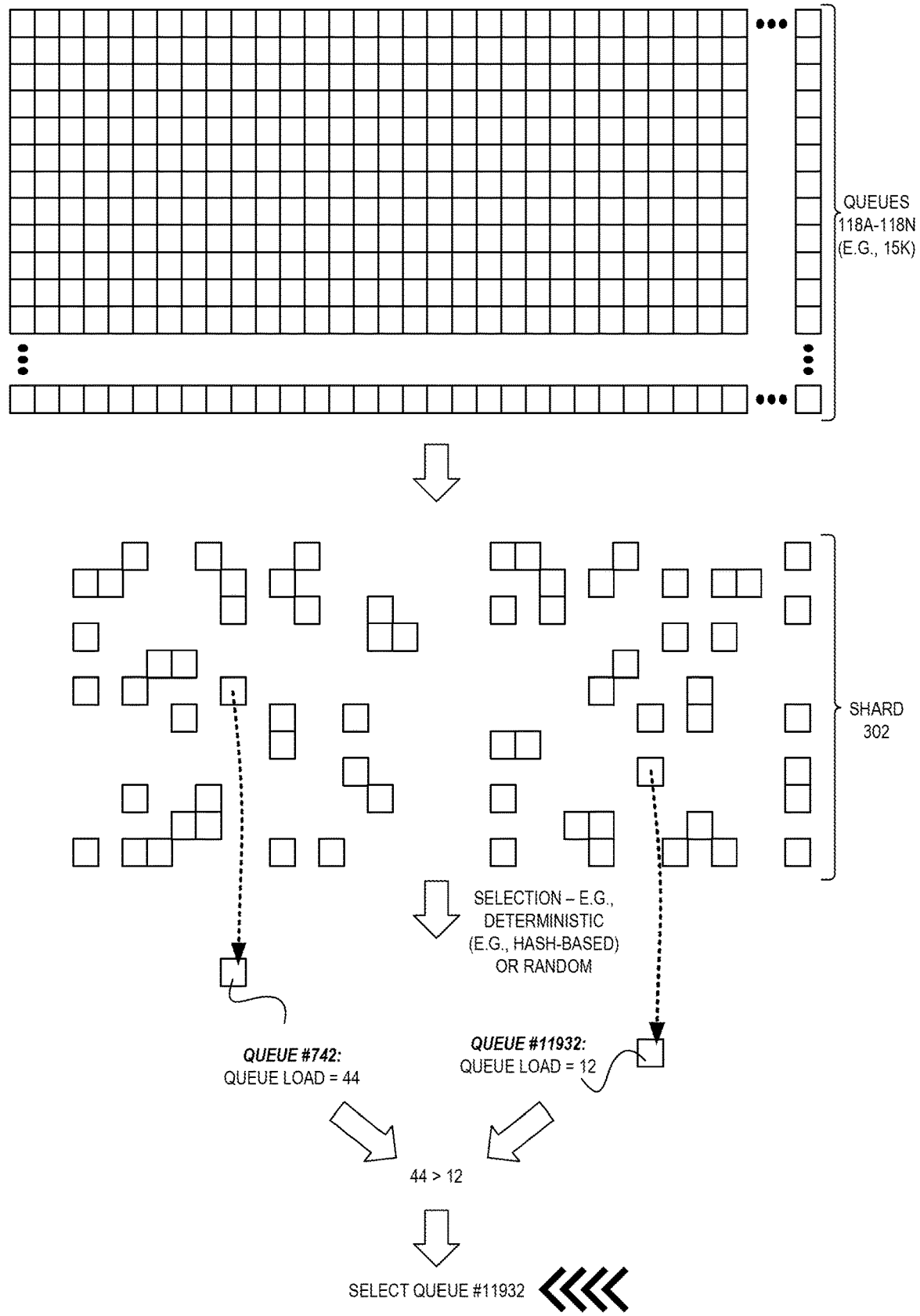
FIG. 3 is a diagram illustrating shard selection and queue selection utilized for shared queue management utilizing shuffle sharding according to some embodiments.

For further detail regarding exemplary techniques for utilizing shuffle sharding to select queues, we turn ahead to FIG. 3, which is a diagram illustrating shard selection and queue selection utilized for shared queue management utilizing shuffle sharding according to some embodiments. Embodiments can perform queue selection techniques to isolate user impact dependent on probability. Thus, instead of playing the continual game of having to scale up and down queue resources—which in reality is quite complicated—embodiments can use some amount of work sharing resources, but apply shuffle sharding techniques to enable probability to assist to eliminate competition for resources by distributing workloads across a limited amount of resources.

As shown in FIG. 3, a number of queues 118A-118N are available to store events. As shown, a relatively large number of queues may be used, such as 15,000, although more or fewer can be used with the same technique.

For a particular request, an associated entity—e.g., the associated user issuing the request, the destination application/function, and/or user providing the destination application/function—can be identified by the poller manager 126A. For example, in various embodiments, a request can include authentication information of the user that submitted the request, an identifier of the targeted destination/function, etc., allowing the poller manager 126A to make the determination of the entity.

For this entity, an associated shard 302 of queues can be identified, which includes fewer queues (e.g., twenty, one hundred, five hundred, etc.) than the entire set of queues 118A-118N. The number of queues in a shard 302 can be flexibly selected by an implementer based on how much concurrency is needed.

Thus, as a system grows/scales it may be desired to allow users to take over more than a static defined number of queues, and because it is important to prevent a user from impacting all the queues (or the resources providing the fleet of queues), the concept of a shard can be employed to ensure that every user can only possibly impact the size of a shard that they are assigned to.

In some embodiments, the queues (of the shard 302) can be determined in a deterministic process such that the same entity will always be associated with this same shard 302. The queues of the shard 302 can be determined in a variety of ways, such as by a consistent hashing technique using an identifier of the entity (e.g., user, application/function, etc.). One example of a consistent hash technique that can be utilized includes the use of a consistent hash ring. In some embodiments, the identifier of the entity can be hashed in some manner to identify a first queue, modified in a formulaic manner (e.g., by appending or prepending a character to the identifier) and hashed again to identify a second queue, and so on.

From the shard 302, the poller manager 126A may then identify a subset of the shard including at least two queues (also referred to as "n" queues) to be considered for request placement. For example, from the shard 302, two queues may be selected using a deterministic or non-deterministic (or "random") technique. In this example, two queues are selected—queue #742 (having a queue load for 44) and queue #11932 (having a queue load of 12), though in other embodiments more queues can be selected, such as three, four, five, etc.

The number of "n" can again be flexibly selected based on the needs of the implementer—e.g., for more concurrency, more than two queues may be selected.

With the selected queues, a "best of n" (here, a "best of 2") technique can be used to identify and select the queue from the set of n queues having a smallest queue load (or "min_load"). In this example, queue #11932 would be selected due to its queue load of 12 being less than the queue load of 44 for queue #742.

Thus, as each user (or user function, etc.) will very likely have a different shard 302 and the events are continually provided to a least-busy queue from a small subset of the shards, it is extremely unlikely that one noisy user will affect another user. This improves a pure best of two implementation even further, in that it provides even more isolation between entities, as well as better utilization with smaller amounts of resources while maintaining the higher probability of preventing noisy neighbors, and also fault isolation.

Thus, a noisy user can be left using the shared pool of queues, and the impact that they will have on other users will be basically non-existent because of this use of shuffle sharding, because any user that overlaps with a particular noisy user will likely have some number of other queues to choose from, and the probability of all of these queues being impacted is miniscule.

Figure 2:
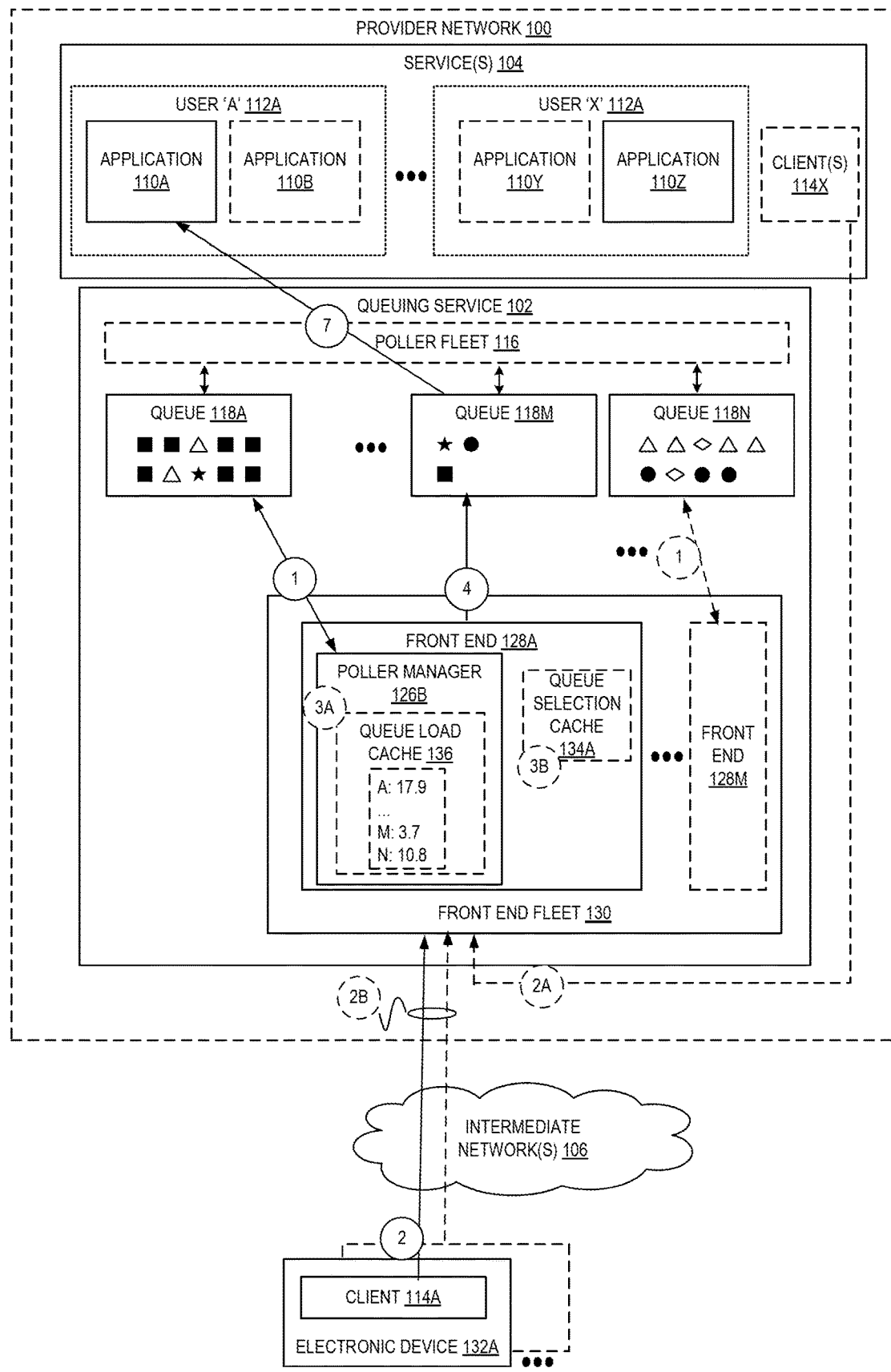
FIG. 2 is a diagram illustrating another environment for performing shared queue management utilizing shuffle sharding with distributed control according to some embodiments.

In addition to the use of a (logically) centralized poller manager 126A as shown in FIG. 1, embodiments can also utilize a distributed approach for shuffle sharding. FIG. 2 is a diagram illustrating another environment for performing shared queue management utilizing shuffle sharding with distributed control according to some embodiments. In contrast to the embodiment of FIG. 1 that included a centralized poller manager 126A, in FIG. 2 the poller manager 126B is implemented as part of each front end 128. Thus, the operations for utilizing shuffle sharding of FIG. 1 are still applicable to the environment of FIG. 2, however in this case the GetQueue messages (request 120 and response 122) may be "internal" to each front end 128A, and thus may be function calls, API calls, etc., issued by the front-end logic to the poller manager 126B. Thus, as shown at circles (1), each poller manager 126B may monitor the queue loads of the queues 118. Although this embodiment may increase the monitoring load as now multiple poller managers 126B may be monitoring the queue loads, this configuration may offer faster queue selection performance in some cases compared to that of the environment of FIG. 1 due to the poller managers 126B being internal to—as opposed to being external to—the front ends, which often increases the time needed to receive a queue selection (e.g., due to eliminating transmission and/or network delays when the poller manager 126A is across a network from the front end 128A).

Figure 4:
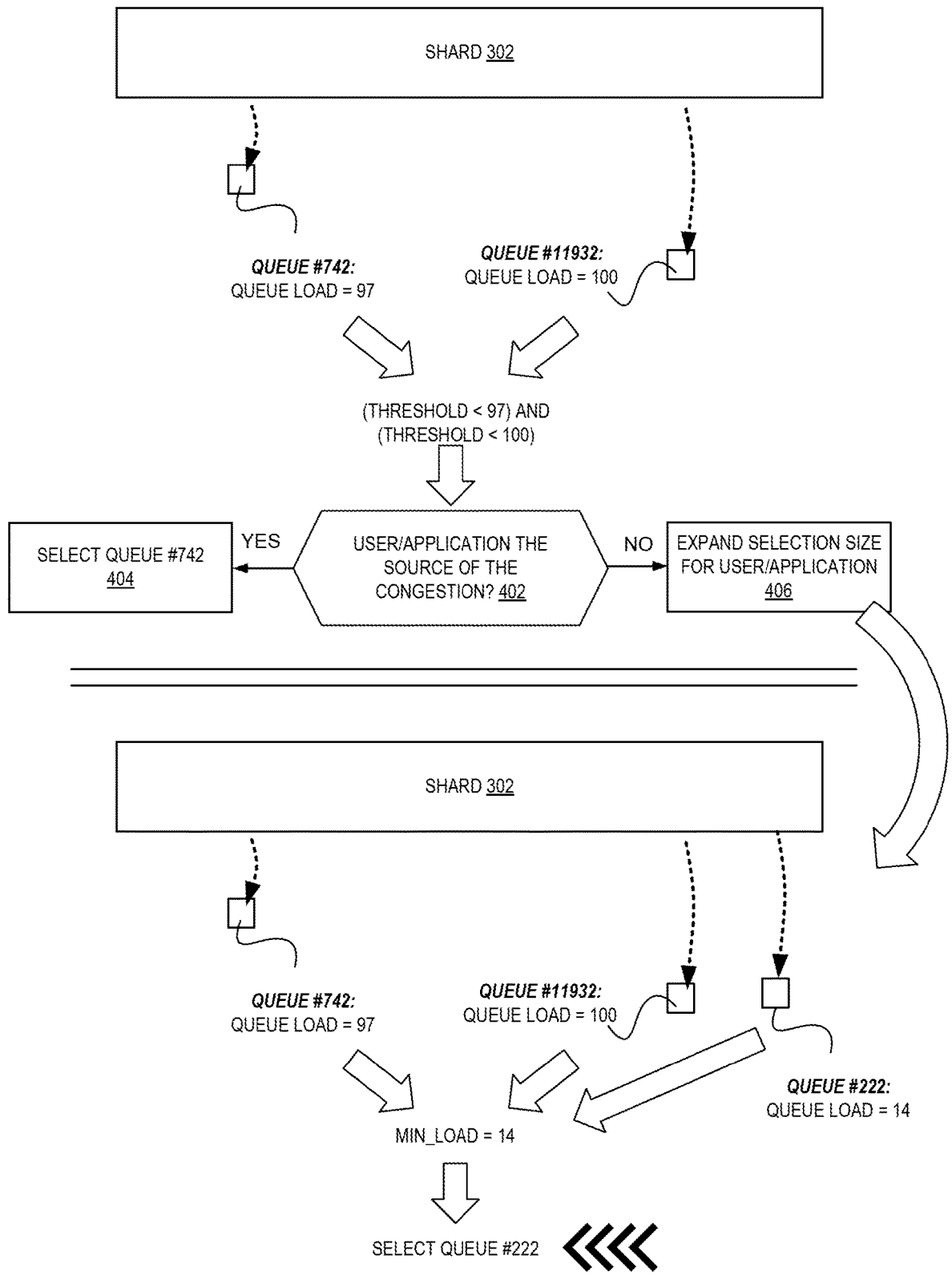
FIG. 4 is a diagram illustrating cross-user congestion mitigation for shared queue management utilizing shuffle sharding according to some embodiments.

Although these techniques reduce the likelihood of a user being affected by another noisy neighbor, it is still possible—though extremely unlikely—for that to occur. Accordingly, embodiments can flexibly mitigate this occurrence using a flexible queue arc size technique. FIG. 4 is a diagram illustrating cross-user congestion mitigation for shared queue management utilizing shuffle sharding according to some embodiments.

In some embodiments, a queue may be determined to be overloaded using a congestion threshold value. The congestion threshold value may be equal to the number of events that a queue can hold—e.g., one hundred. Thus, if the queue is completely full by holding one hundred events, a congestion condition of being equal to or greater than the congestion threshold value (of one hundred) is satisfied. Alternatively, in some embodiments the congestion threshold value can be set lower—e.g., to 95% or 90% of the maximum possible request capacity—to prevent a queue from being completely saturated.

As shown in the top portion of FIG. 4, from a shard 302 two queues may be selected—whether randomly or deterministically—as queue #742 and queue #11932. In this case, we assume that a congestion threshold value is set at 95% (or 95 of 100 queues), and thus the queue loads of 97 and 100 respectively are both determined to be congested.

Upon this occurrence, at block 402 a determination can be made as to whether the particular user/application associated with the request is the cause of the congestion. Block 402 can include querying the queues or another control plane entity to determine whether a majority (or supermajority, or some threshold amount) of the events currently and/or recently in the queue are due to one or more other users/applications.

If this user/application is the cause of the congestion, at block 404 the queue having the smallest queue load is selected for the destination, as a user/application causing congestion may potentially "suffer" from the congestion it created.

However, if this user/application is not the cause of the congestion, at block 406 the selection size of the candidate queues from the shard can be increased—e.g., from two queues to three queues—which provides the opportunity for the user/application to find another queue that is unlikely to be affected by the noisy neighbor. Thus, as shown at the bottom of FIG. 4, three queues can be selected—queue #742 and queue #11932 and now queue #222, having a depth of 14. At this point, the queue load of 14 is less than the congestion threshold and is less than the other queue loads of 97 and 100, and is selected as the destination for the request.

Figure 5:
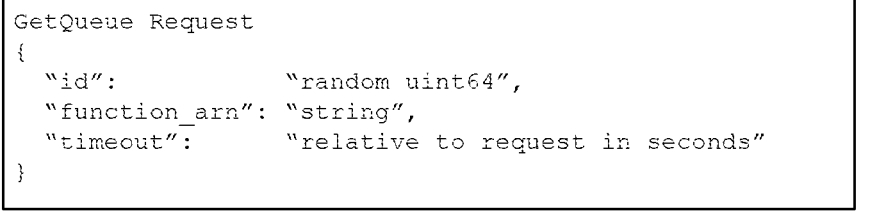
FIG. 5 is a diagram illustrating an exemplary GetQueue request message and an exemplary GetQueue response message for shared queue management utilizing shuffle sharding according to some embodiments.
Figure 5:
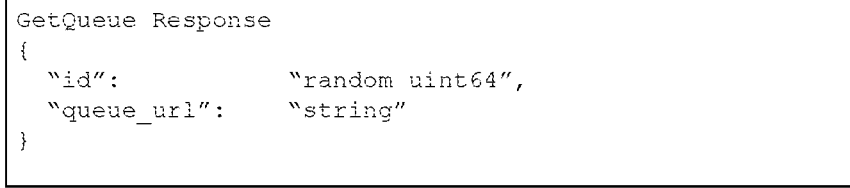

As described above, "GetQueue" requests 120 and responses 122 may be utilized by a front end 128 to communicate with a poller manager 126 to determine a destination queue selected for a request. FIG. 5 is a diagram illustrating an exemplary GetQueue request message 500 and an exemplary GetQueue response message 550 for shared queue management utilizing shuffle sharding according to some embodiments. The GetQueue request message 500 may be sent in a data payload of an HTTP request message, and may be formatted (e.g., using JavaScript Object Notation (JSON), eXtensible Markup Language (XML), or the like). In this example, the GetQueue request message 500 includes a field for an identifier ("id") for the request (in this example, a random unsigned 64-bit integer), a field for an identifier (or "resource name") of the user function to be invoked for the request ("function_arn") that is a string value, and a field for a timeout ("timeout") that is relative to the request.

The exemplary GetQueue response message 550 may include the same identifier (or "id") passed in the exemplary GetQueue request message 500 to indicate that the response corresponds to the request. The exemplary GetQueue response message 550 may also include an identifier of a selected queue—here, a Uniform Resource Locator (URL) assigned to or used by a queue that can be used to send the request to.

Figure 6:
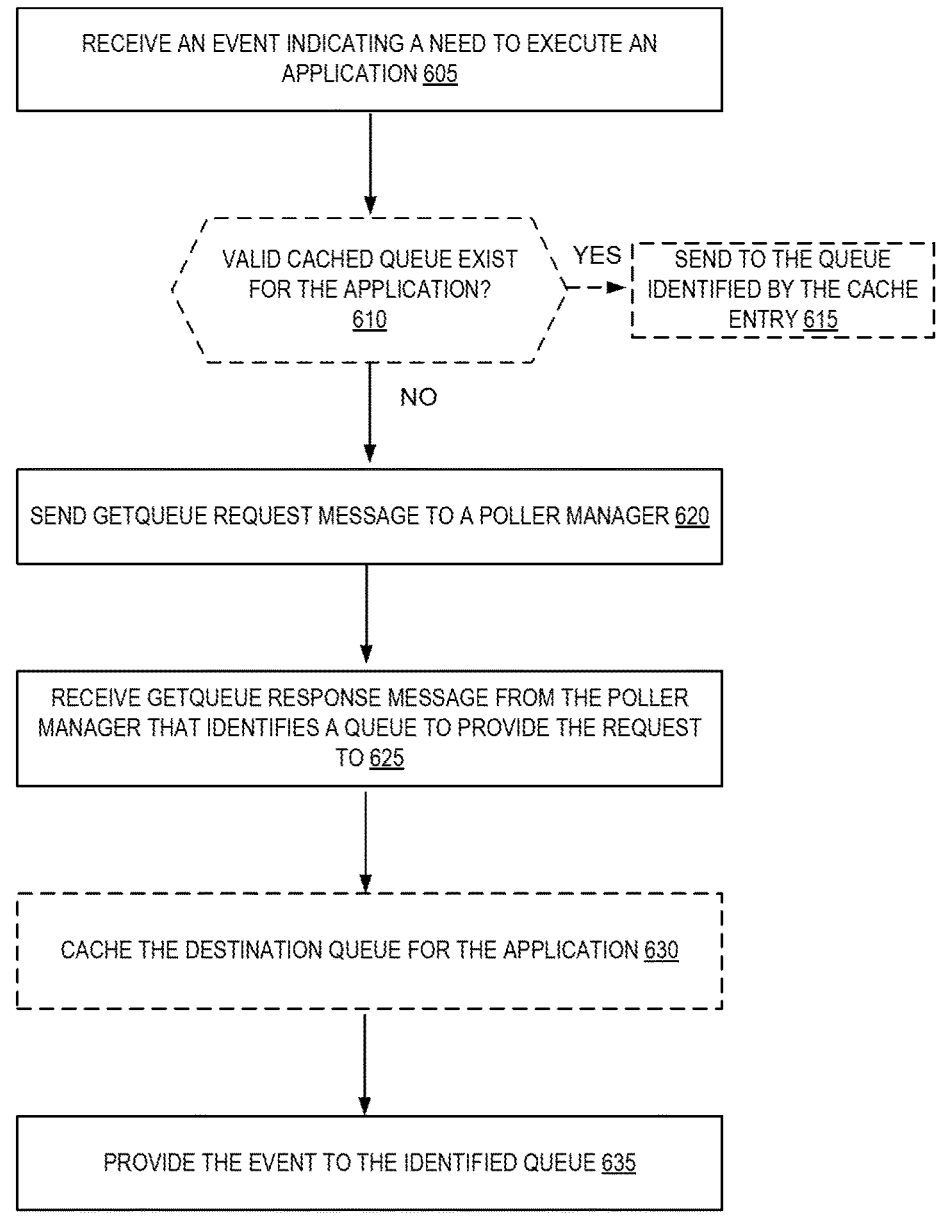
FIG. 6 is a diagram illustrating operations of a method for routing events to queues according to some embodiments.

FIG. 6 is a diagram illustrating operations 600 of a method for routing events to queues according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by a front end 128 of the other figures.

The operations 600 include, at block 605, receiving an event indicating a request to execute an application. The application may be a user-defined function or code that is to be executed based on the request. The request may be originated from another application, service, or client.

Optionally, as shown at block 610, the operations 600 include determining whether a valid cached queue exists for the application. For example, in some embodiments a queue selection cache is maintained with cache entries identifying a particular queue (e.g., via a URL) that is to be used for events involving a particular user or destined for a particular application or user function. A cache entry may be valid when it has not timed out, as a cache entry may only remain valid for a particular amount of time upon its entry into the queue or last update. When a valid cache entry exists, the operations 600 optionally include, at block 615, sending the request to the queue identified by the cache entry.

When a valid cached queue entry does not exist, or in embodiments not utilizing block 610, the operations 600 continue to block 620, and sending a GetQueue request message to a poller manager. The GetQueue request message may be sent via one or more HTTP request messages, and may specify one or more of: an identifier of the request, an identifier of an application (e.g., a user function) to be executed for the request, or a timeout value.

The operations 600 include, at block 625, receiving a GetQueue response message from the poller manager that identifies a queue to provide the request to. The GetQueue response message may be sent via one or more HTTP response messages, and may specify one or more of: the identifier provided in the GetQueue request, or an identifier of a queue (e.g., a URL).

The operations 600 optionally include, at block 630, caching the destination queue for the application. For example, a table, map, or similar data structure may be updated to map an identifier of the application to an identifier of the selected queue. This data structure may be utilized for a later request within optional block 610.

The operations 600 also include, at block 635, providing the request to the identified queue. In some embodiments, block 635 includes obtaining the identifier of the queue from the GetQueue response message and sending the request using the identifier (e.g., sending to a destination Internet Protocol (IP) address that is the identifier).

Figure 7:
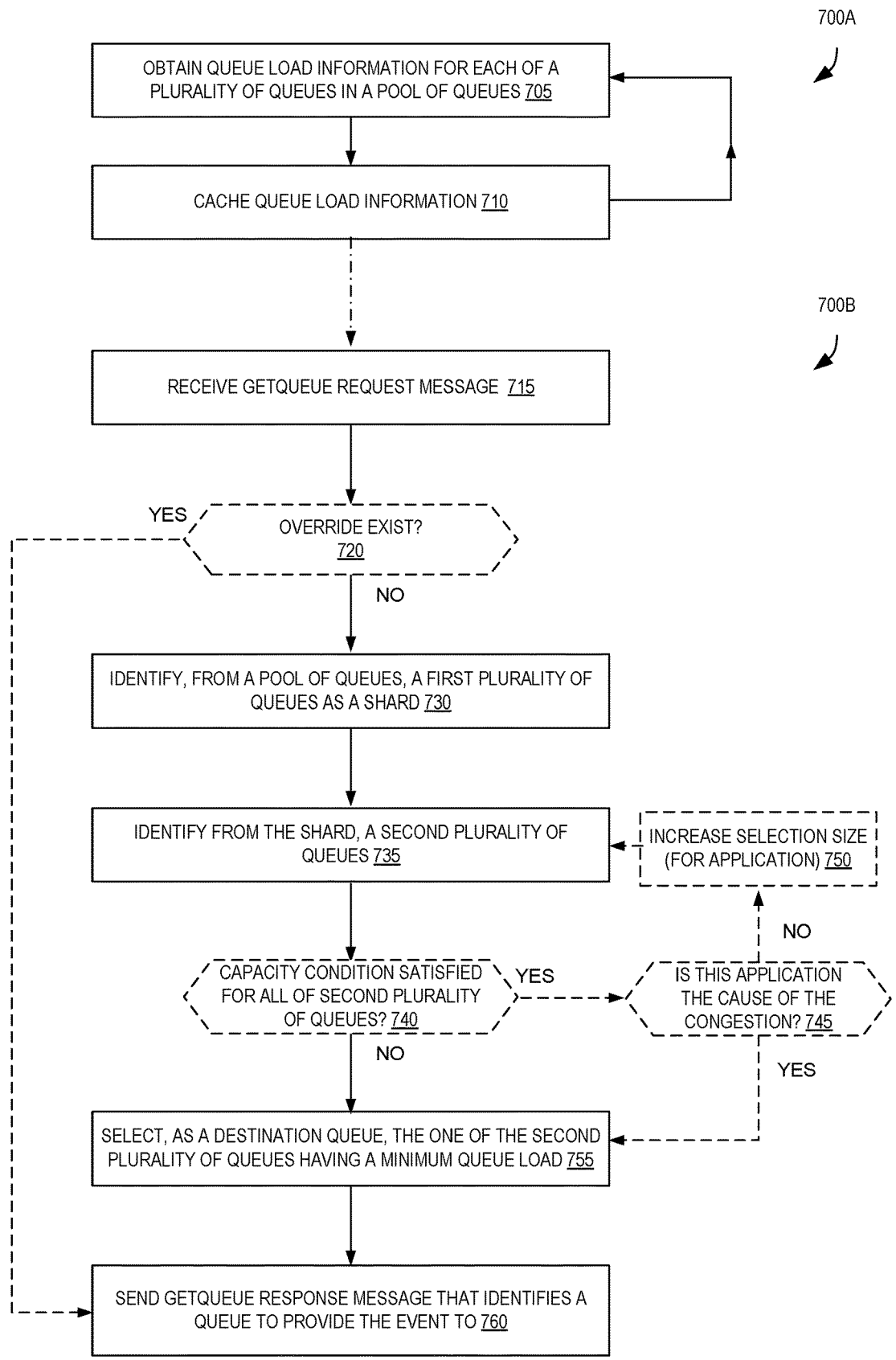
FIG. 7 is a diagram illustrating operations of methods for determining destination queues for events according to some embodiments.

FIG. 7 is a diagram illustrating operations 700A-700B of methods for determining destination queues for events according to some embodiments. Some or all of the operations 700A-700B (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700A-700B are performed by a poller manager 126 of the other figures.

The operations 700A include, at block 705, obtaining queue load information for each of a plurality of queues in a pool of queues. Block 705, in some embodiments, includes sending a request to each of the plurality of queues to solicit current queue information from those queues, and receiving a response from each of the plurality of queues carrying the current queue information, which includes a queue load. Block 705, in other embodiments, includes querying a monitoring service or other control plane service to obtain queue load information for the plurality of queues. In various embodiments, there can be tens of queues, hundreds of queues, thousands of queues, tens of thousands of queues, or more.

The operations 700A include, at block 710, caching the queue load information in a data structure. In some embodiments, the queue load information comprises a queue load value for each of the plurality of queues that can be obtained (or "looked up") using an identifier of a queue.

At some point, the operations 700A may move to operations 700B. However, even after this move, operations 700A may continue to be performed one or multiple times after some amount(s) of time, e.g., according to a schedule.

The operations 700B include, at block 715, receiving a GetQueue request message. The GetQueue request message may be originated by a front end responsive to the front end not knowing which queue to provide a request to. The GetQueue request message may be sent via one or more HTTP request messages, and may specify one or more of: an identifier of the request, an identifier of an application (e.g., a user function) to be executed for the request, or a timeout value.

The operations 700B include, at optional decision block 720, determining whether an override exists for the application identified by the GetQueue request message. In some embodiments, a particular application may be manually/ statically mapped to a particular queue, and this mapping may be noted in an override data structure. Block 720 may thus include determining whether an entry exists within the override data structure for the application, and if so, determining what queue is to be used.

When an override exists, optionally the operations 700B continue to block 760, and sending a GetQueue response message that identifies the queue from the override data structure that is to be provided the event.

When no override exists, or when logic corresponding to decision block 720 is not utilized, the operations 700B continue to block 730, and identifying, from a pool of queues, a first plurality of queues as a shard. In some embodiments, a particular number of the pool of queues are selected. The selection may be based on the application associated with the request, the user associated with the request, etc. The selection may be deterministic so that the same shard is identified repeatedly for a particular application and/or user.

The operations 700B also include, at block 735, identifying, from the shard, a second plurality of queues. The second plurality of queues include fewer queues than the shard. In some embodiments, the second plurality of queues includes two queues. In other embodiments, the second plurality of queues includes three queues, or more queues. The selection may be a random selection of two or more queues from the shard.

The operations 700B include, at optional decision block 740, determining whether a capacity condition is satisfied for all of the second plurality of queues. In some embodiments, when all of the second plurality of queues are completely full, the capacity condition is satisfied. In other embodiments, when all of the second plurality of queues have a queue load that is greater than or equal to some value (which may be less than full capacity), the capacity condition is satisfied.

When the capacity condition is satisfied, optionally the operations 700B continue to block 745 and determining whether this application (that is to process the request) and/or user is the cause of the congestion (as reflected by the capacity condition being satisfied). In some embodiments, block 745 includes querying another service for concurrency information associated with the application, and in some embodiments, block 745 includes determining a number of recent and/or current events that involve the application and/or user. If not, the operations 700B may include optional block 750, and increasing the selection size (for application and/or user) so that the second plurality of queues will include more queues. The operations 700B may optionally then continue to block 735.

However, if it is determined at block 745 that the application is the cause of the congestion, or in embodiments not utilizing logic corresponding to decision block 740, the operations 700B continue to block 755, and selecting, as a destination queue, the one of the second plurality of queues having a minimum queue load. Block 755 may include looking up and comparing cached queue load values for each of the second plurality of queues.

The operations 700B further include, at block 760, sending a GetQueue response message that identifies a queue to provide the request to.

Figure 8:
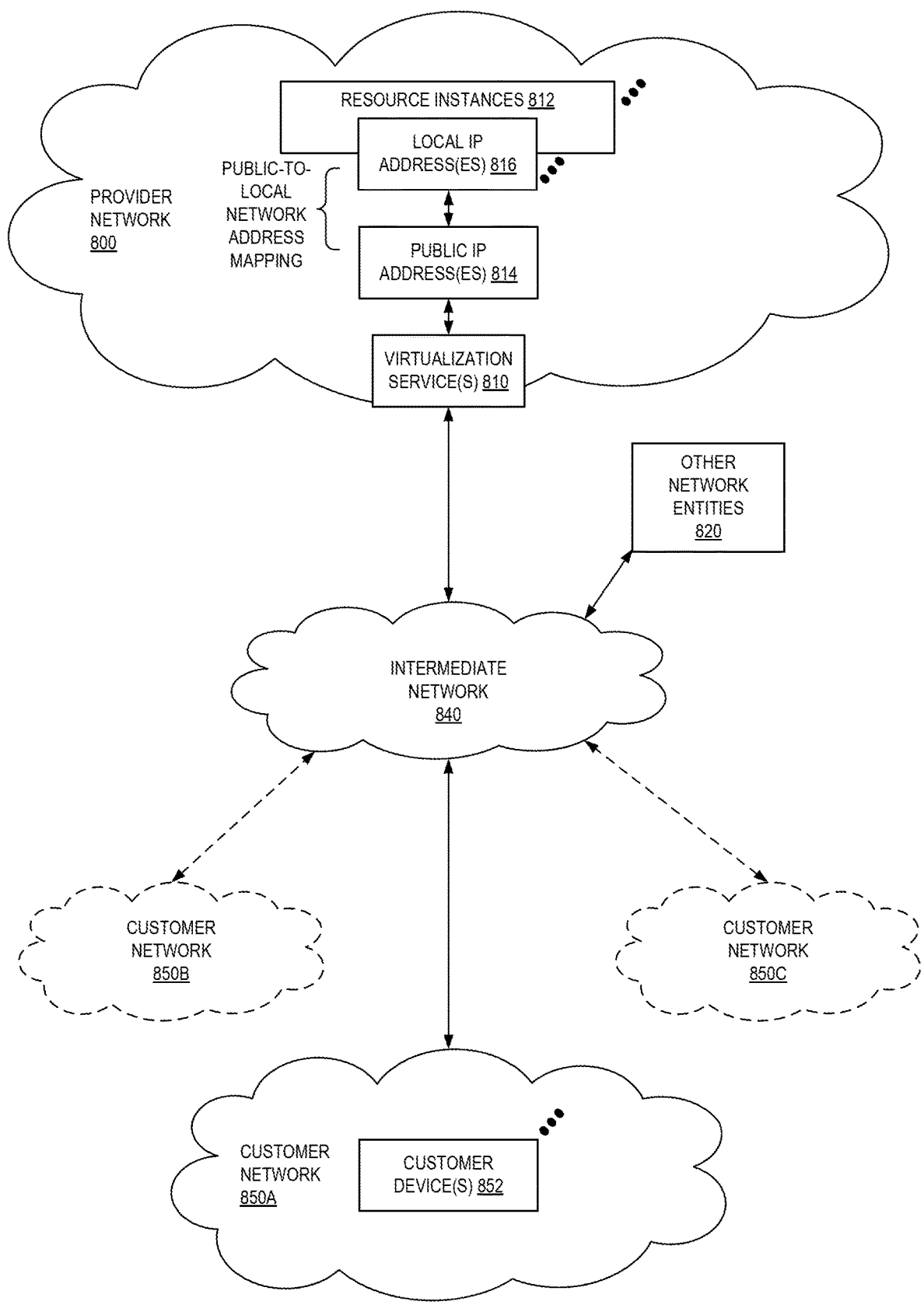
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
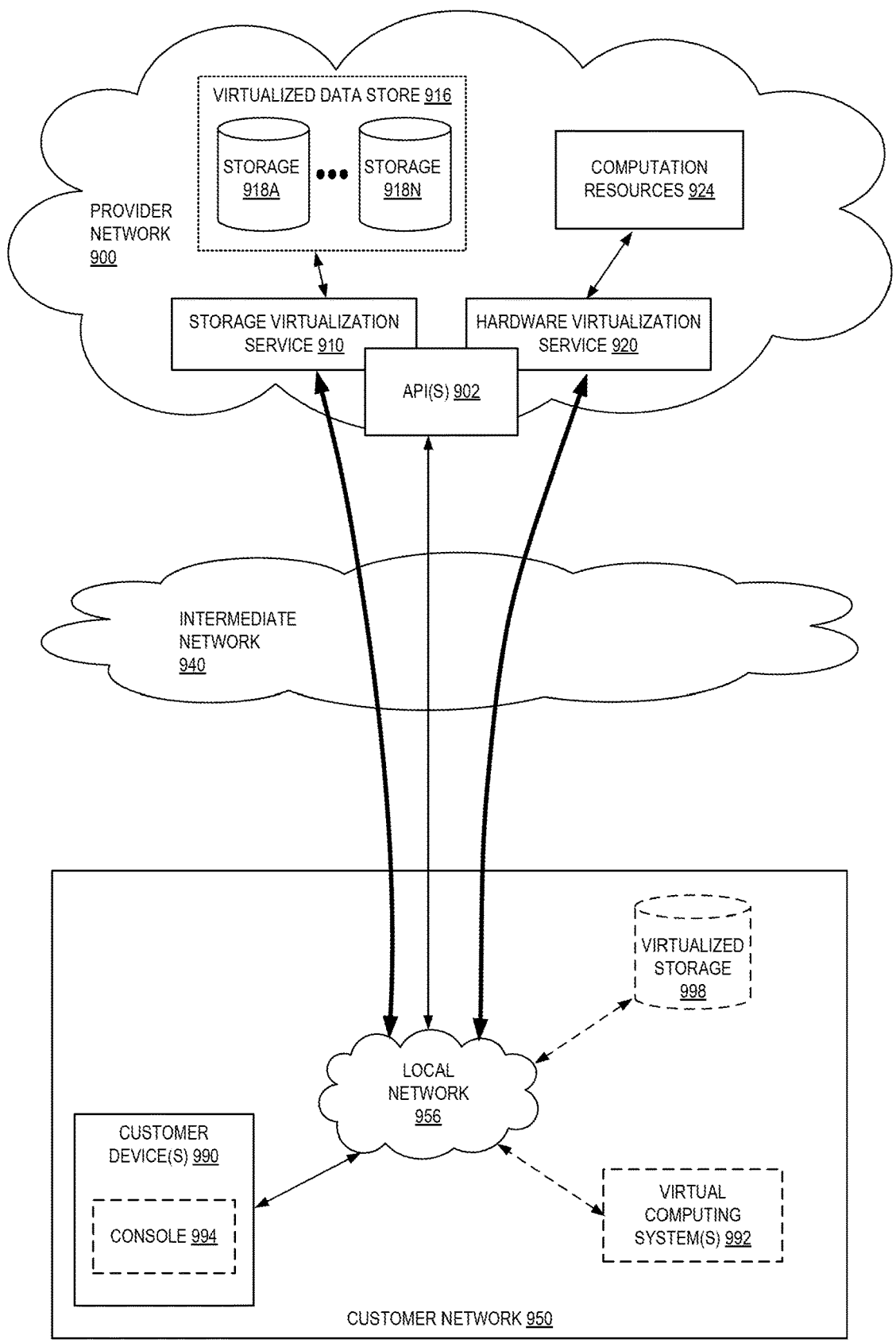
FIG. 9 is a block diagram of an example provider network that provides a storage virtualization service and a hardware virtualization service to customers according to some embodiments.

FIG. 9 is a block diagram of an example provider network that provides a storage virtualization service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage virtualization service 910, for example via one or more APIs 902, to access data from and store data to storage resources 918A-918N of a virtual data store 916 provided by the provider network 900. In some embodiments, a virtualized data store gateway (not shown) may be provided at the customer network 950 that may locally cache at least some data, for example frequently accessed or critical data, and that may communicate with virtualized data store service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes, which appear to the user as local virtualized storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative System

Figure 10:
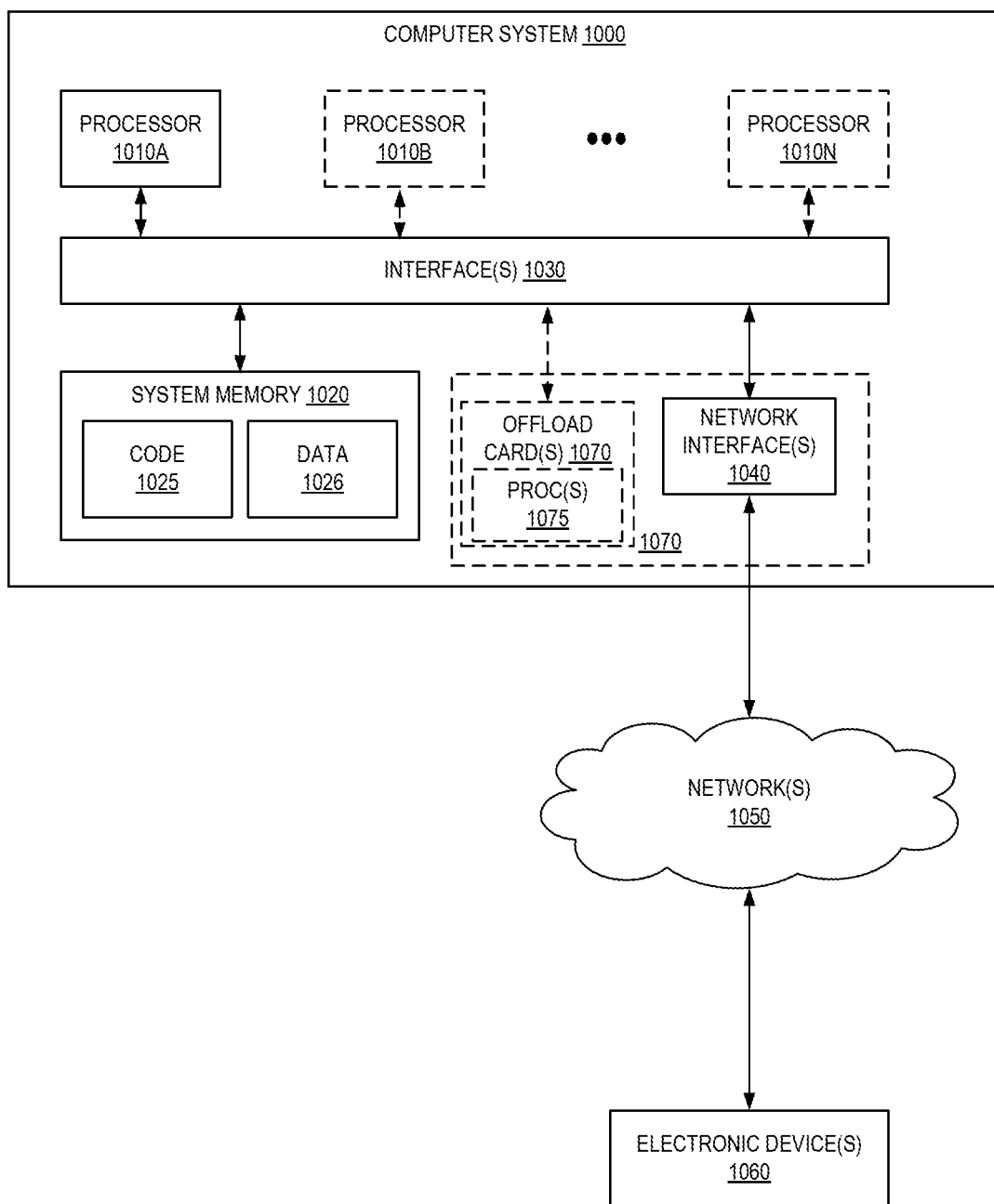
FIG. 10 is a block diagram illustrating an example computer system that may be used in some embodiments.

In some embodiments, a system that implements a portion or all of the techniques for performing shared queue management utilizing shuffle sharding as described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Figure 11:
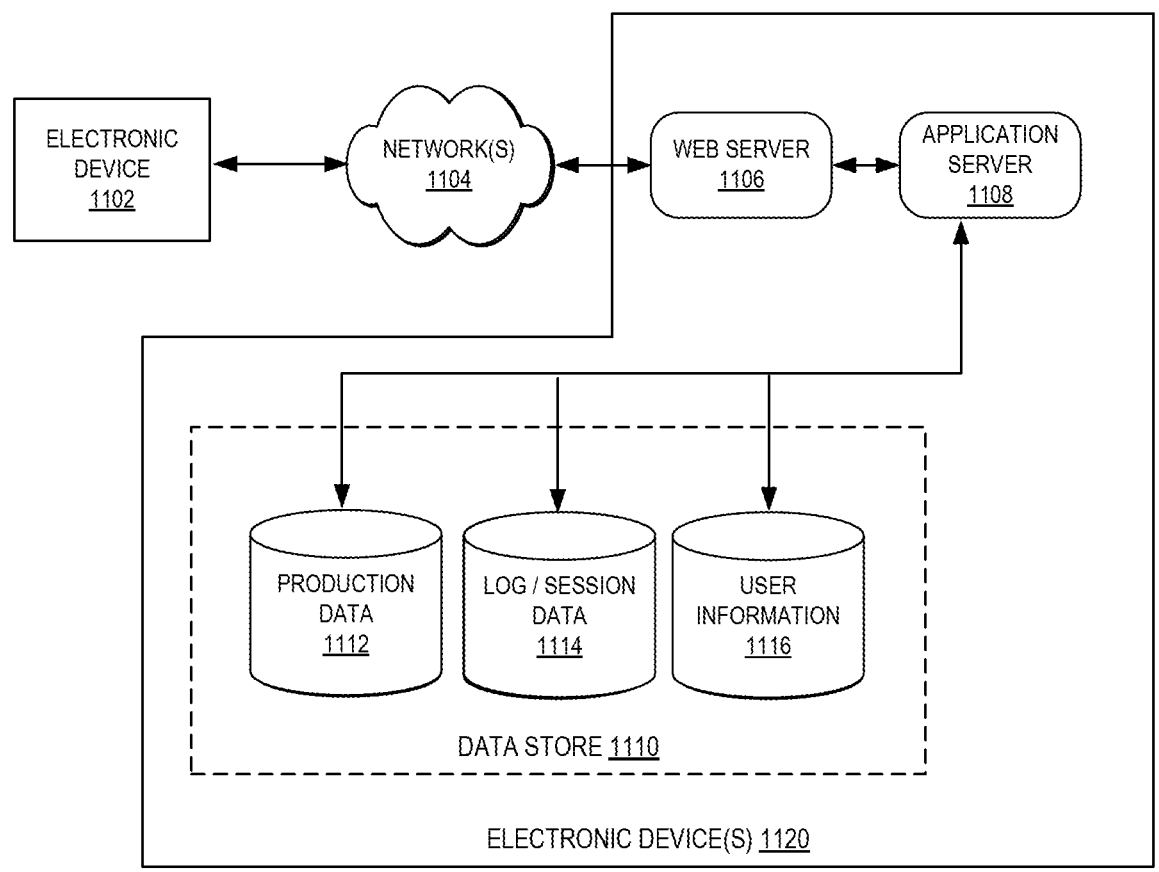
FIG. 11 illustrates an example of an environment for implementing aspects in accordance with various embodiments.

As discussed, different approaches can be implemented in various environments in accordance with the described embodiments. For example, FIG. 11 illustrates an example of an environment 1100 for implementing aspects in accordance with various embodiments. For example, in some embodiments the GetQueue request and/or GetQueue response messages are HyperText Transfer Protocol (HTTP) requests that are received by a web server (e.g., web server 1106), and the users, via electronic devices, may interact with the provider network via a web portal provided via the web server 1106 and application server 1108. As will be appreciated, although a web-based environment is used for purposes of explanation, different environments may be used, as appropriate, to implement various embodiments. The system includes an electronic client device 1102, which may also be referred to as a client device and can be any appropriate device operable to send and receive requests, messages or information over an appropriate network 1104 and convey information back to a user of the device 1102. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1104 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1104 includes the Internet, as the environment includes a web server 1106 for receiving requests and serving content in response thereto, although for other networks an alternative device serving a similar purpose could be used, as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device 1102 and handling a majority of the data access and business logic for an application. The application server 1108 provides access control services in cooperation with the data store 1110 and is able to generate content such as text, graphics, audio, video, etc., to be transferred to the client device 1102, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1102 and the application server 1108, can be handled by the web server 1106. It should be understood that the web server 1106 and application server 1108 are not required and are merely example components, as structured code discussed herein can be executed on any appropriate device or host machine as discussed elsewhere herein.

The data store 1110 can include several separate data tables, databases, or other data storage mechanisms and media for storing data relating to a particular aspect. For example, the data store illustrated includes mechanisms for storing production data 1112 and user information 1116, which can be used to serve content for the production side. The data store 1110 also is shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. In one example, a user might submit a search request for a certain type of item. In this case, the data store 1110 might access the user information 1116 to verify the identity of the user and can access a production data 1112 to obtain information about items of that type. The information can then be returned to the user, such as in a listing of results on a web page that the user is able to view via a browser on the user device 1102. Information for a particular item of interest can be viewed in a dedicated page or window of the browser.

The web server 1106, application server 1108, and/or data store 1110 may be implemented by one or more electronic devices 1120, which can also be referred to as electronic server devices or server end stations, and may or may not be located in different geographic locations. Each of the one or more electronic devices 1120 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the environment 1100 in FIG. 11 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Many embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 110A-110Z, 128A-128M, 118A-118N, etc.) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, at a queueing service in a provider network, an event to be queued, the event related to input from a user and indicating a need to execute a user function;
   obtaining, based on the user function associated with the event, identifiers of a first plurality of queues from a pool of queues, the first plurality of queues including fewer queues than the pool of queues;
   selecting identifiers of a second plurality of queues from the identifiers of the first plurality of queues according to a random selection technique, the second plurality of queues including fewer queues than the first plurality of queues; and
   causing the event to be placed in a queue from the second plurality of queues having a smallest queue load of all queue loads of the second plurality of queues, wherein each queue load is based on a predicted execution weight of events in the corresponding queue.

2. The computer-implemented method of claim 1, wherein:
   the first plurality of queues includes fewer than half of the pool of queues; and
   the second plurality of queues includes two of the first plurality of queues.

3. The computer-implemented method of claim 1, wherein the obtaining of the first plurality of queues is performed according to a deterministic procedure that results in the same first plurality of queues being obtained for another event associated with the user function.

4. A computer-implemented method comprising:
   receiving a request for an identifier of a queue to receive an event related to input from a user, the event indicating a need to execute a user function;
   obtaining, based on the request, identifiers of a first plurality of queues from a pool of queues, the first plurality of queues including fewer queues than the pool of queues;
   selecting identifiers of a second plurality of queues from the identifiers of the first plurality of queues, the second plurality of queues including fewer queues than the first plurality of queues; and
   sending a response comprising the identifier of a queue from the second plurality of queues associated with a smallest queue load of all queue loads of the second plurality of queues.

5. The computer-implemented method of claim 4, wherein the request is received from a front end of a queuing service and includes an identifier of the user function.

6. The computer-implemented method of claim 5, wherein the response is sent to the front end and causes the front end to place the event in the queue.

7. The computer-implemented method of claim 4, wherein each of the pool of queues is a shared queue that is shared by multiple users.

8. The computer-implemented method of claim 4, wherein each queue load of the queue loads of the second plurality of queues is based at least in part on a number of events in the corresponding queue at a point in time.

9. The computer-implemented method of claim 8, wherein each queue load of the queue loads of the second plurality of queues is based on an estimated processing time for each of the events in the corresponding queue at the point in time.

10. The computer-implemented method of claim 4, wherein the selecting the second plurality of queues is performed in a deterministic manner.

11. The computer-implemented method of claim 4, wherein the selecting the second plurality of queues is performed in a random manner.

12. The computer-implemented method of claim 4, wherein the request includes an identifier of the user function to be executed, wherein the user function comprises one of compiled code or source code.

13. The computer-implemented method of claim 4, further comprising obtaining and caching queue load information for each queue of the pool of queues.

14. The computer-implemented method of claim 4, further comprising determining that a queue override does not exist for the user function to be executed based on the event or a user that caused the event to be generated.

15. A system comprising:
    a first one or more electronic devices of a service provider network to implement a pool of queues, the first one or more electronic devices comprising at least a first processor, the pool of queues to store events;
    a second one or more electronic devices of the service provider network to implement a front end, wherein the first one or more electronic devices and the second one or more electronic devices comprise at least a second processor to execute instructions and at least one memory, the front end including instructions that upon execution cause the front end to:
      receive an event, to be queued, the event related to input from a user;
      send a request to a poller manager for an identifier of a queue from the pool of queues to receive the event;
      receive a response from the poller manager including the identifier of the queue; and
      cause the event to be inserted into the queue; and
    the second one or more electronic devices of the service provider network to implement the poller manager, the poller manager including instructions that upon execution cause the poller manager to:
      receive the request;
      obtain, based on the request, identifiers of a first plurality of queues from the pool of queues;
      select identifiers of a second plurality of queues from the identifiers of the first plurality of queues;
      determine that the queue has a smallest queue load of all queue loads of the second plurality of queues; and
      send the response that includes the identifier of the queue.

16. The system of claim 15, wherein the at least one of the event, the request, or the response is carried by a HyperText Transfer Protocol (HTTP) message.

17. The system of claim 15, wherein each queue of the pool of queues is a shared queue that is shared by multiple users.

18. The system of claim 15, wherein each queue load of the queue loads of the second plurality of queues is based at least in part on a number of events present in the corresponding queue at a point in time.

19. The system of claim 18, wherein each queue load of the queue loads of the second plurality of queues is based on an estimated processing time for each of the events in the corresponding queue at the point in time.

20. The system of claim 15, wherein the front end is further to:
- update a queue selection cache based on the response received from the poller manager;
- identify the queue using the queue selection cache for a second event to be queued that involves a same user or user function to be executed based on the event; and
- cause the second event to be inserted into the queue.

* * * * *